United States Patent [19]

Hewitt

[11] Patent Number: 5,358,264
[45] Date of Patent: Oct. 25, 1994

[54] MOBILE MACHINE SUPPORT

[76] Inventor: Timothy W. Hewitt, 18 Kensington, Pleasant Ridge, Mich. 48069

[21] Appl. No.: 844,204

[22] Filed: Mar. 2, 1992

[51] Int. Cl.5 ............................................. B62B 3/00
[52] U.S. Cl. .................................................. 280/79.11
[58] Field of Search ................... 280/47.34, 79.11; 16/35 R; 361/6 R

[56] References Cited

U.S. PATENT DOCUMENTS

| | | | |
|---|---|---|---|
| 2,980,270 | 4/1961 | Elliot et al. | 280/79.11 |
| 3,552,761 | 1/1971 | Sjöblom | 280/79.11 |
| 4,035,864 | 7/1977 | Schröder | 16/35 R |
| 4,166,638 | 9/1979 | De Prado | 280/79.11 |
| 4,572,531 | 2/1986 | Elia | 280/79.11 |
| 5,005,848 | 4/1991 | Cornell | 280/79.11 |

Primary Examiner—Eric Culbreth
Attorney, Agent, or Firm—Gifford, Groh, Sprinkle, Patmore and Anderson

[57] ABSTRACT

A mobile machine support having an I-shaped frame structure. The frame structure has a centrally-disposed longitudinal member and two parallel transverse members attached to the opposite ends of the longitudinal members. The transverse members are stabilized by attaching their ends to the longitudinal member by means of angularly disposed brace members. Lockable rear wheels are attached to the ends of one of the two transverse members, and a front wheel is swivably attached to the other of the two transverse members substantially in alignment with the longitudinal member.

14 Claims, 1 Drawing Sheet

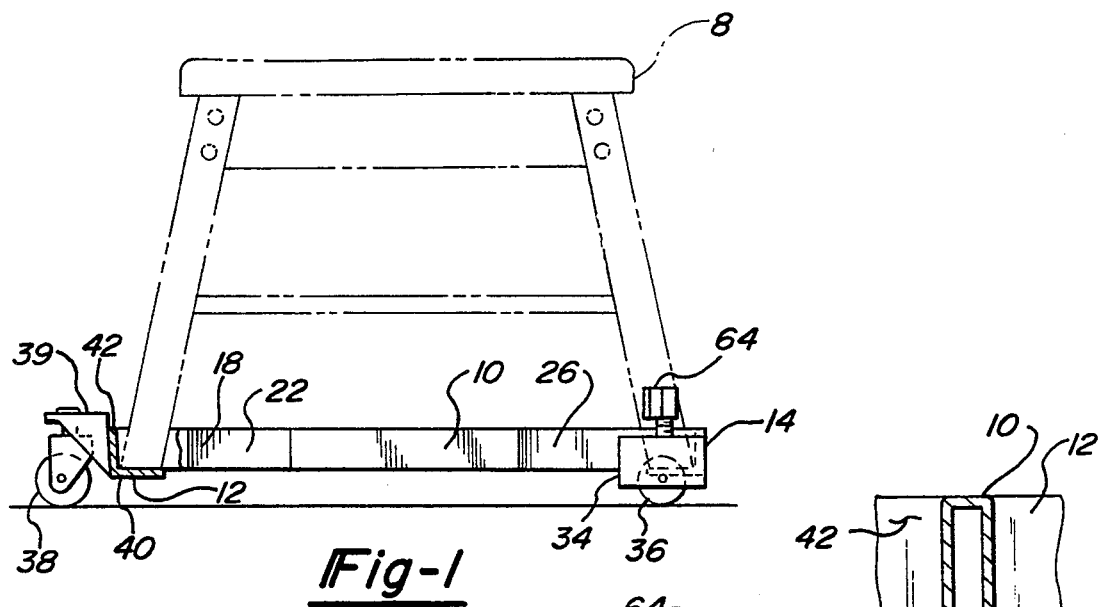
*Fig-1*
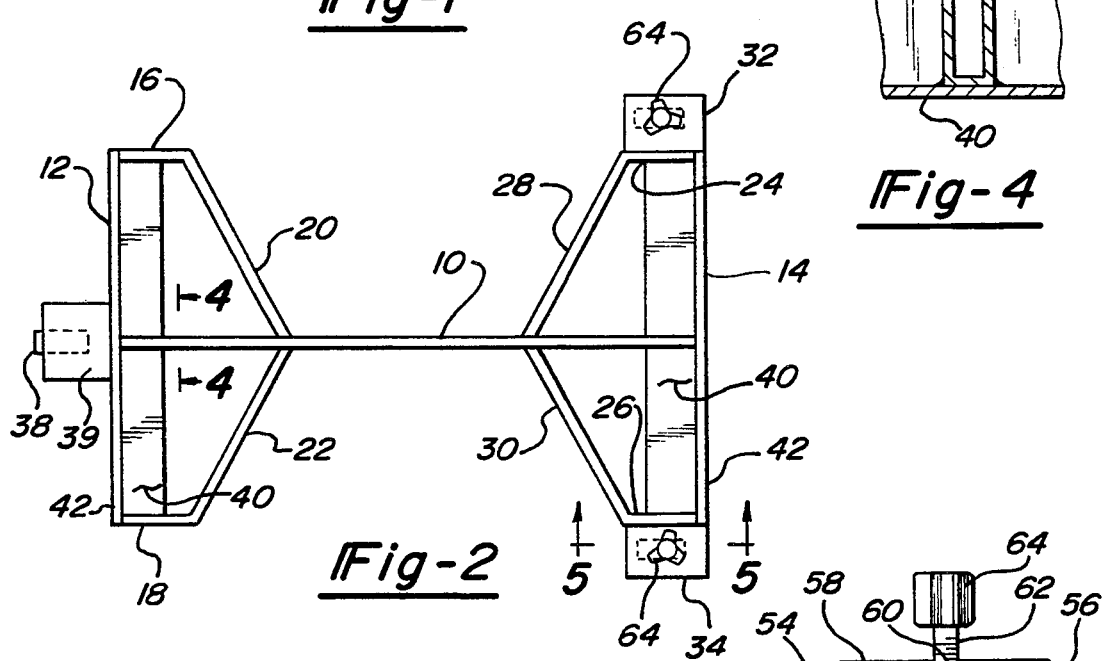
*Fig-2*  *Fig-4*  *Fig-5*
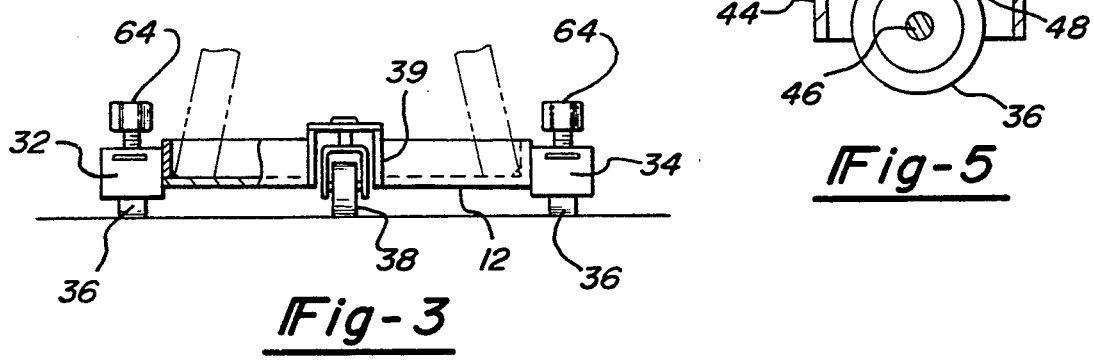
*Fig-3*

MOBILE MACHINE SUPPORT

BACKGROUND OF THE INVENTION

I. Field of the Invention

The invention is related to the field of mobile support structures and, in particular, to a mobile structure for machines and machines mounted on a work bench.

II. Description of the Prior Art

Many machines, such as table saws, grinders, lathes, drill presses, etc., are mounted on table-type structures which rest on the floor of the workplace. Both in industry and in the home, there usually is not sufficient workspace for independent set up and use of several different types of machines. Therefore, when a machine is not being used, it is often desirable to move it to a storage location or to any other location where it will not interfere with the operation of another machine. Alternately, a machine like a table saw may be stored in a garage and it may be desirable to move the machine out of the garage for use to prevent sawdust from permeating the entire interior of the garage.

To alleviate this problem, some manufacturers of these types of machines provide wheels which give them the desired degree of mobility. However, many of these machines do not have wheels making them difficult, and sometimes impossible to be moved by a single person.

The invention is a mobile support for a machine or a worktable on which a machine is mounted permitting the machine to be moved from place to place as desired.

SUMMARY OF THE PRESENT INVENTION

The invention is a mobile support for a machine having an "I"-shaped frame structure. The frame structure has a centrally-disposed longitudinal member and two parallel transverse members attached to the opposite ends of the longitudinal member. The frame structure also includes a platform associated with each of the two transverse members for supporting the legs of the machine, and angularly-disposed brace members, each brace member having one end connected to a respective end of each of the two transverse members and the other end connected to the longitudinal member. A pair of rear wheels are attached to the ends of one of the transverse members, and a caster wheel is connected to the other transverse member in alignment with the longitudinal member. The two rear wheels each have brake mechanisms which when set prevent the rotation of the rear wheels. The mobile support is preferably a welded steel structure but an alternative may be a molded structure made from a structural plastic.

The object of the invention is a sturdy mobile structure for a machine or a table on which a machine is mounted.

Another object of the invention is a mobile machine support having an "I"-shaped frame structure.

Another object of the invention is a mobile machine support having maximum clearance on each side thereof for the feet of the operator.

A final object of the invention is a support structure which permits the machine to be moved by a single person without exerting excessive force.

These and other objects of the invention will become more apparent from a reading of the detailed description of the invention in conjunction with the accompanying drawings.

BRIEF DESCRIPTION OF THE DRAWINGS

FIG. 1 is a side view of the mobile machine support;
FIG. 2 is a top view of the mobile machine support;
FIG. 3 is a front view of the mobile machine support;
FIG. 4 is a cross-sectional view showing the hollow rectangular structure of the center member; and
FIG. 5 is a cross-sectional view showing the details of the wheel assembly.

DETAILED DESCRIPTION OF THE PREFERRED EMBODIMENT OF THE PRESENT INVENTION

The details of the mobile machine support are shown in FIGS. 1 through 5. The mobile machine support is normally used to support a machine (not shown) mounted on a table or stand 8, such as shown in phantom in FIG. 1. Referring to FIG. 2, the mobile machine support is in the form of a capital "I" having a longitudinal or center channel member 10, a first transverse or front cross member 12, and a second transverse or rear cross member 14 substantially parallel to the front cross member 12. The center channel member 10 preferably is made from a hollow rectangular steel channel as shown in FIG. 4 but may be made from a "U"-shaped channel or an I beam. The front and rear cross members 12 and 14 respectively, have an "L"-shaped cross-section having a horizontally extending base portion 40 and a vertical portion 42. The base portions 40 of the front and rear cross members, 12 and 14, form a seat or platform on which the legs of the stand 8 rest.

The front and rear cross members 12 and 14 are disposed normal to the center member 10 and are welded to the ends thereof. Side plates 16 and 18 have one end attached to the ends of front cross member 12 and lie in a vertical plane parallel to center channel member 10. Likewise, side plates 24 and 26 have one end attached to the ends of rear cross member 14 and also lie in a vertical plane parallel to the center channel member 10. Brace members 20 and 22 connect the other ends of the side plates 16 and 18 to the center channel member to stabilize the orientation of the front cross member 12 which respect to the center channel member 10. In a like manner, braces 28 and 30 connect the other ends of side plates 24 and 26 respectively to the center channel member 10 to stabilize the orientation of the rear cross member 14 with respect to the center channel member 10. Preferably, the braces 20, 22, 28 and 30 have a width equal to the width of center member 10 and are disposed at an angle of approximately 60° to the center channel member 10 as shown. However, these braces may be oriented relative to the center channel member 10 at any other suitable or desirable angle. As shown in FIG. 3, the bottoms of the side plates 20, 22, 28 and 30 are also welded to the base portions 40 of the front and rear cross member to provide additional structural rigidity at the location where the legs of the stand 38 rest.

A rear wheel assembly 32 is fixedly attached to side plate 24 and a like rear wheel assembly 34 is fixedly attached to side plate 26. As shown in FIG. 5, the rear wheel assemblies 32 and 34 have an external housing 44. The housing 44 preferably has a rectangular shape and is sized to receive a wheel 36. An axle 46 is attached to the housing and rotatably supports the wheel 36 therein. A brake member 48 is disposed in the housing 44 above the wheel 36. Tabs 50 and 52 are provided at opposite ends of the brake member which are received in slots 54 and 56 provided on opposite sides of the housing 44 to hold the brake member 48 in the housing 44. The top 58 of the housing 44 has a threaded aperture 60 into which a locking screw 62 is threaded. The locking screw 62 has an enlarged head 64 which functions as a handle to facilitate the turning of the locking screw 62. The enlarged head 64 may have a three lobe star shape, as shown, or any other shape known in the art. The rotation of the locking screw 62 in a first direction displaces the brake 48 to engage the wheel 36 preventing it from rotating while rotation of the locking screw 62 in the opposite direction releases the brake 48 from the wheel 36. The brake 48 is preferably made from spring steel and has a width at least as great as the width of the wheel 36. The use of the brake 48 interposed between the locking screw 62 and the wheel 36 prevents the locking screw from damaging the peripheral surface of the wheel 36.

A swivel caster wheel 38 is rotatably mounted to a front support bracket 39. The front support bracket is fixedly attached to the center of the front cross member 12, as shown, and supports the swivel caster wheel in alignment with the center member 10. The swivel caster wheel 38 may include a wheel locking mechanism (not shown) as is known in the art.

Preferably, as described above, the mobile machine support is a welded steel structure. However, as is known in the art, the mobile machine support may be made from aluminum, aluminum alloys or structural plastics. Also, instead of a welded structure, appropriate fasteners may be used to attach the individual elements to each ether, as shown.

It is not intended that the invention be limited to the specific structure shown on the drawings and described in the detailed description of the invention. It is recognized that those skilled in the art may make certain changes and improvements thereto within the concept of the invention set froth in the appended claims.

What is claimed is:

1. A mobile support for an apparatus having four legs, comprising:
   an "I"-shaped frame structure having a centrally-disposed longitudinal member and two parallel transverse members attached to the opposite ends of said longitudinal member;
   a platform associated with each of said two transverse members for supporting said legs of said machine within said frame structure;
   angularly-disposed brace members connecting the ends of said two transverse members to said longitudinal member;
   a pair of rear wheels attached to the ends of one of said two transverse members rotatable about an axis normal to said longitudinal axis; and
   a centrally-disposed front wheel swivelably mounted to the other of said two transverse members in line with said longitudinal member, said front wheel solely supporting one end of said apparatus.

2. The mobile support of claim 1 wherein the cross-section of each of said two transverse members is L-shaped having a vertical portion and a horizontal portion, and wherein said horizontal portion of each of said two transverse members constitutes said platform supporting said legs of said machine.

3. The mobile support of claim 1 wherein said longitudinal member is a hollow rectangular member.

4. The mobile support of claim 1 further including four side plates, one end of each of said four side plates being attached to an end of said two transverse members, and wherein said angularly disposed brace members are connected to respectively an opposite end of said side plates.

5. The mobile support of claim 4 further including means for locking said pair of wheels to inhibit the rotation thereof.

6. The mobile support of claim 5 wherein said means for locking comprises:
   a rectangular housing attached to each of said side plates attached to the ends of said one of said two transverse members;
   an axle disposed in each of said housings for rotatably supporting respectively one of said pair of rear wheels therein, a portion of each of said pair of rear wheels extending downwardly external to said housing;
   a brake member resiliently supported in each housing adjacent to its associated rear wheel; and
   means for displacing said brake member to engage its associated wheel to prevent the rotation thereof.

7. The mobile support of claim 1 wherein said longitudinal member is a metal "I"-shaped frame member.

8. The mobile support of claim 7 wherein said metal is steel.

9. The mobile support of claim 7 wherein said metal is an aluminum alloy.

10. The mobile support of claim 1 wherein said "I"-shaped frame structure is a structural plastic frame member.

11. A machine support for supporting the legs of a machine comprising:
    a front member;
    a parallel rear member laterally displaced from said front member, said front and rear members, each having an "L"-shaped cross section, said front and rear members each having a vertical portion and a base portion extending horizontally from the bottom of said vertical portion, said base portions of said front and rear members extending from their respective vertical portions towards each other;
    a transversely-disposed center member having one end attached to a center of said front member and the opposite end attached to a center of said rear member to form an "I"-shaped structure;
    a first pair of side plates disposed parallel to said center member, one end of each of said first pair of said plates being attached to a respective end of said front member;
    a second pair of side plates disposed parallel to said center member, one end of each of said second pair of side plates being attached to a respective end of said rear member, said first and second pairs of side plates extending towards each other;
    a first pair of angularly disposed brace members each brace member of said first pair having one end attached to the opposite end of a respective one of said first pair of side plates and the opposite end attached to said center member;
    a second pair of angularly disposed brace members, each brace member of said second pair having one end attached to the opposite end of a respective one of said second pair of side plates and its opposite end attached to said center member;
    a wheel assembly attached to each side plate of said second pair of side plates each wheel assembly having a wheel rotatable about an axis transverse to said center member; and a front wheel swivelably attached to a front member in line with said center member, said front wheel solely supporting said legs Of a machine.

12. The machine support of claim 11 wherein said center section has a hollow rectangular cross section.

13. The machine support of claim 11 wherein each wheel assembly further includes a brake mechanism for inhibiting the rotation of each of said wheels.

14. The machine support of claim 13 wherein each wheel assembly comprises:

a rectangular housing attached to a respective one of said second pair of side plates;

an axle disposed in said housing for rotatably supporting a respective one of said wheels therein with a portion of said respective one wheel extending downwardly external to said housing;

a brake member resiliently supported in said housing adjacent to said respective one wheel; and means for displacing said brake member to engage said respective one wheel to prevent said respective one wheel from rotating.

* * * * *